(12) United States Patent
Horiuchi et al.

(10) Patent No.: US 6,170,340 B1
(45) Date of Patent: Jan. 9, 2001

(54) TORQUE DETECTION MECHANISM FOR A FLEXED MESHING TYPE GEAR DRIVE

(75) Inventors: Masashi Horiuchi; Ivan Godler, both of Nagano-ken; Minoru Hashimoto, Kagoshima-ken, all of (JP)

(73) Assignee: Harmonic Drive Systems, Inc., Tokyo (JP)

( * ) Notice: Under 35 U.S.C. 154(b), the term of this patent shall be extended for 0 days.

(21) Appl. No.: 08/990,802

(22) Filed: Dec. 15, 1997

(51) Int. Cl.$^7$ .................................................. G01L 3/02
(52) U.S. Cl. .................................................. 73/862.321
(58) Field of Search ................ 73/862.321, 862.23, 73/862.26, 862.25, 862.325, 862.326

(56) References Cited

U.S. PATENT DOCUMENTS 4,522,075 * 6/1985 Pohl ................................... 73/862.23
6,000,289 * 12/1999 Horiuchi et al. ................ 73/862.325

* cited by examiner

*Primary Examiner*—Benjamin R. Fuller
*Assistant Examiner*—Jewel V. Thompson
(74) *Attorney, Agent, or Firm*—Burns, Doane, Swecker & Mathis, L.L.P.

(57) ABSTRACT

A cup-shaped flexible external gear 3 of a flexed meshing type gear drive 1 is flexed into an elliptical shape by a wave generator 4. A first torque detection device 6 is disposed on a portion of the external gear 3, for example, on a diaphragm 33 thereof which has a pair of torque detection elements arranged at an angular interval of 90° around a center axis 1*a*. Likewise, a second torque detection device 7 is also disposed, which has a pair of torque detection elements arranged at an angular interval of 90°. The first and second torque detection devices 6, 7 are arranged at an angular interval of (k×45°) around the center axis 1*a* with each other. A torque detection mechanism of this invention synthesizes outputs of the two torque detection devices 6, 7, thereby realizing a high accurate torque detection with quite few effect of rotational ripple and with high linearity.

10 Claims, 12 Drawing Sheets

Zero Angle Gauge Position

(a) Zero Angle Gauge Position (b) 45° Angle Gauge Position

Fig. 6

Outputs and Errors
of
Full Bridge FB_C

(a) Positions of Four Strain Gauges (b) 90° Offset Positions (c) Combined Positions of (a) and (b)

TORQUE DETECTION MECHANISM FOR A FLEXED MESHING TYPE GEAR DRIVE

BACKGROUND OF THE INVENTION

1. Field of the Invention

This invention relates to a torque detection mechanism for a flexed meshing type gear drive. In particular, this invention pertains to a torque detection mechanism which is capable of compensating detection errors (rotational ripple) thereof occurring in accordance with rotation of an input shaft even when no torque is transferred. Further, this invention also pertains to a torque detection mechanism which is capable of enhancing linearity of a torque detection output.

2. Related Art Description

A typical flexed meshing type gear drive has a circular rigid internal gear, a circular flexible external gear disposed inside the rigid internal gear, and a wave generator having an elliptical shape fixed into the flexible external gear. The flexible external gear is flexed into elliptical shape by the wave generator, whereby teeth of the external gear which are located on both ends of a major axis of the elliptical shape are meshed with teeth of the rigid internal gear. These meshing portions of the teeth moves circumferentially as the wave generator connected to an input shaft rotates. As a result, relative rotation between the flexible external gear and rigid internal gear occurs in responsive of the difference in number of teeth between the both gears.

As a torque detection mechanism applicable to this type of flexed meshing type gear drive, one has been known that is constituted so that strain gauges as a torque detection element are adhered on an outer circumferential surface of a cup-shaped flexible external gear and, based on detected strain, an amount of torque transferred via the flexed meshing type gear drive is calculated.

Each part of the flexible external gear is repeatedly deformed in its radial direction by the wave generator. Thus, even when no torque is transferred, each part of the flexible external gear is deformed radially as an input shaft connected to the wave generator rotates. More specifically, each part of the elliptically deformed flexible external gear is repeatedly deflected radially at two cycles per rotation of the wave generator connected to the input shaft. As a result, an output corresponding to such deflection is inevitably obtained from the strain gauges.

In order to assure torque detection with high accuracy, it is necessary to delete output error contents (rotational ripple) due to such cyclic deflection from a detected output so as to obtain an amount of strain corresponding only to the transferred torque. The strain varies in the form of a sign wave having a phase of 180°, and therefore it can be deleted by a combination of outputs from a pair of torque detection elements such as strain gauges which are provided on the flexible external gear at an angular interval of 90°.

Conventionally, a pair of strain gauges are adhered on an outer circumferential surface of the flexible external gear so that these strain gauges are arranged at an angular interval of 90° around a rotational axis of the gear drive, and a combined or synthesized output of these strain gauges is used to calculate a torque transferred through the gear drive.

It is necessary for enhancing a detection accuracy of torque transferred through the flexed meshing type gear drive to improve linearity of torque detection output as well as to make sure of deleting rotational ripple included in the torque detection output.

SUMMARY

Accordingly, an object of this invention is to greatly improve detection accuracy of transferred torque compared to the case where a conventional torque detection device is employed in which torque detection elements are arranged at an angle of 90°.

Namely, an object of this invention is to propose a torque detection mechanism for a flexed meshing type gear drive which is capable of carrying out a high accurate torque detection by means of deleting rotational ripple included in an torque detection output.

In addition, an object of this invention is to propose a torque detection mechanism for a flexed meshing type gear drive which is capable of carrying out a high accurate torque detection by improving linearity of a torque detection output.

Furthermore, an object of this invention is to propose a torque detection mechanism for a flexed meshing type gear drive which is able to delete rotational ripple included in a torque detection output more certainly than in a conventional torque detection mechanism and at the same time to greatly improve linearity of the torque detection output.

In order to achieve the above objects, a torque detection mechanism for a flexed meshing type gear drive is constituted so that it comprises a first torque detection means which has a pair of torque detection elements arranged on at least one of outer and inner surfaces of a flexible external gear except for where external teeth are formed, these torque detection elements being arranged at an angular interval of 90° around a center axis of the flexible external gear, and a second torque detection means which has a pair of torque detection elements arranged at an angular interval of 90° around the center axis of the flexible external gear. The second torque detection means is arranged at an angular position (k×45°) offset from the first torque detection means around the center axis (k is odd number). Further, detection outputs of these first and second torque detection means are synthesized, based on which a torque transferred via the flexed meshing type gear drive is detected.

According to the torque detection mechanism of this invention, rotational ripple amplitude included in the torque detection output can be greatly reduced and a high accurate detection of transferred torque can be realized. At the same time, it is possible to improve linearity of torque detection output, whereby a detection accuracy of transferred torque can also be enhanced.

In order to further improve linearity of torque detection output, it is preferable that the second torque detection means is arranged at an angular position between 90 to 270° angles offset from the first torque detection means around the center axis.

In addition, for the purpose of further improvement of linearity of torque detection output, it is preferable to provide, in addition to the first and second torque detection means, a third torque detection means having a pair of torque detection elements arranged on at least one of outer and inner surfaces of a flexible external gear except for where external teeth are formed, these torque detection elements being arranged at an angular interval of 90° around a center axis of the flexible external gear, and a fourth torque detection means which has a pair of torque detection elements arranged at an angular interval of 90° around the center axis of the flexible external gear. In this case, the second torque detection means is arranged at an angular position 45° offset from the first torque detection means around the center axis, while the third and fourth torque detection means are arranged respectively at angular positions 180° and 225° offset from the first torque detection means around the center axis.

Whereas, it is also possible to adopt such an arrangement of the first to fourth torque detection means that the second, third and fourth torque detection means are placed at angular positions offset from the first torque detection means around the center axis by 22.5, 45 and 67.5°, respectively. With this arrangement, the rotational ripple amplitude included in the torque detection output can be reduced further more.

Instead of the above arrangement, the first to fourth torque detection means may be placed as follows for deleting the rotational ripple from the torque detection output. Namely, the positional relationship between the first and second torque detection means is the same as that in the above-mentioned arrangement. While, the third and fourth torque detection means are placed at angular positions offset from the first and second torque detection means around the center axis by 90°, respectively.

One of a flexed meshing type gear drive to which this invention can be adopted, is a cup-type one that comprises a cup-shaped flexible external gear having a tubular body, a disk-shaped diaphragm closing one end of the body, a thick boss integrally formed at the center of the diaphragm, and external teeth formed on an outer circumferential surface at the side of an open end of the body. In this case, the torque detection means are disposed on either side of the body or the diaphragm.

Another type of a flexed meshing type gear drive to which this invention can be applied, is a silk-hat one that comprises a silk-hat shaped flexible external gear tubular body, a circular diaphragm extending radially and outwardly from one end of the body, a thick boss integrally formed on an outer circumferential rim of the diaphragm, and external teeth formed on an outer circumferential surface of the other end of the body. In this case also, the torque detection means are disposed on either side of the body or the diaphragm.

Next, the torque detection means which can be employed for the torque detection mechanism of this invention may be of a strain-gauge type, magnetostrictive type, photo type, ultrasonic type or the like. One of these types of torque detection means can be employed, or a combination of two or more types of these can also be employed.

BRIEF DESCRIPTION OF THE DRAWINGS

FIG. 5(a) is a graph showing output of a first torque detection device of the zero-angle strain-gauge position on the diaphragm with respect to input torque, while FIG. 5(b) is that showing output of a second torque detection device of the 45° angle strain-gauge position on the diaphragm with respect to input torque;

FIG. 6(a) is a graph showing output of a first torque detection device of the zero-angle strain-gauge position on the body with respect to input torque, while FIG. 6(b) is that showing output of a second torque detection device of the 45° strain-gauge position on the body with respect to input torque;

DETAILED DESCRIPTION OF PREFERRED EMBODIMENTS

Referring now to the drawings, examples of this invention will be described.

Figure 1:
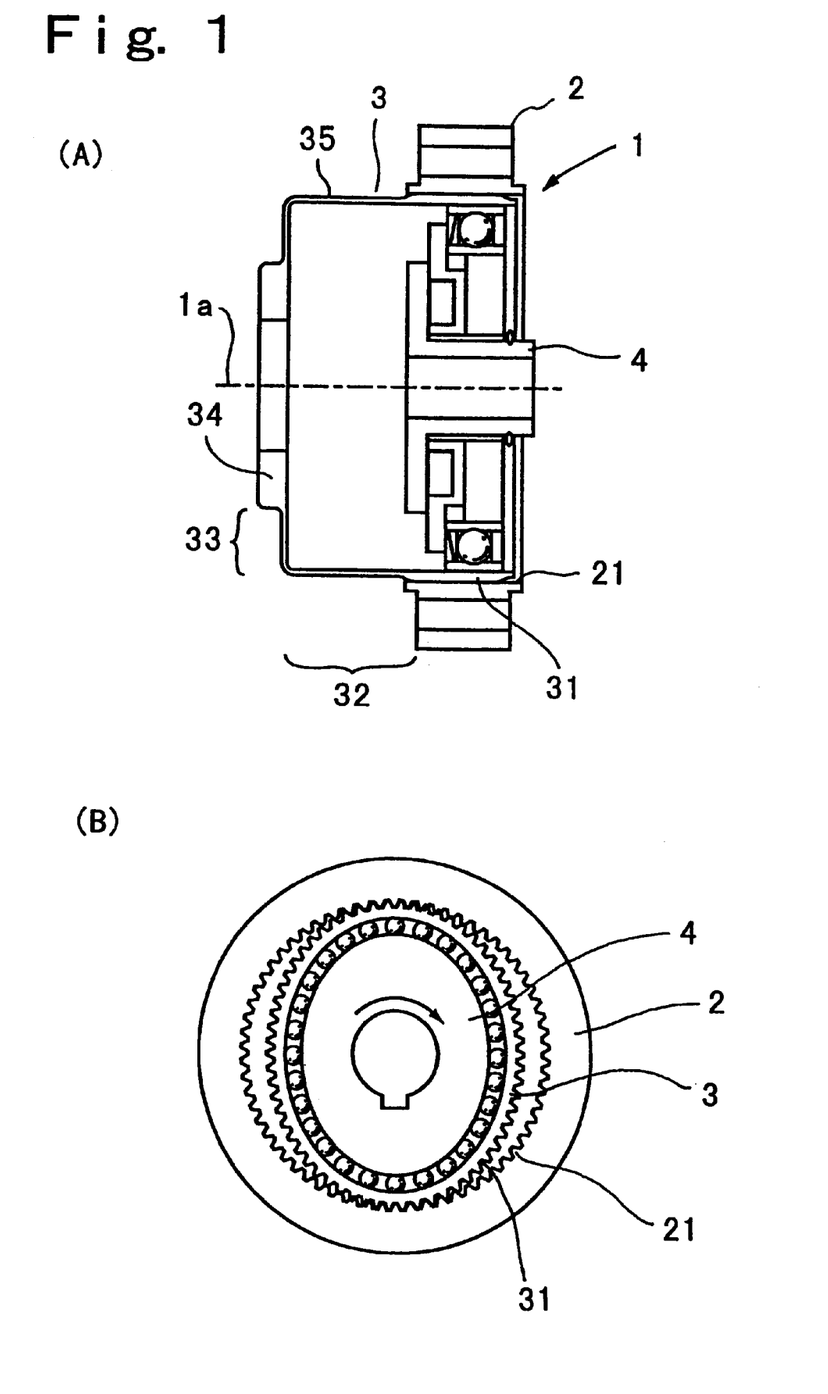
FIGS. 1(A) and 1(B) are a schematic longitudinal sectional view and a schematic cross sectional view, respectively, of a cup-type flexed meshing type gear drive to which this invention can be applied.

FIG. 1 shows an example of a flexed meshing type gear drive to which this invention can be applied. The shown gear drive is a cup-type flexed meshing type gear drive 1 which comprises a circular rigid internal gear 2, a cup-shaped flexible external gear 3 disposed inside the rigid internal gear 2, and a wave generator 4 fixed into the flexible external gear 3. The wave generator 4 has an elliptical profile and is inserted into the flexible external gear 3 to flex it into an elliptical shape, whereby portions of external teeth 31 of the flexible external gear 3 located on both sides of a major axis of the elliptical shape are meshed with internal teeth 21 of the rigid internal gear 2. The wave generator 4 is connected to an input shaft (not shown), high-speed rotation of which causes to move the meshing portions of the external teeth 31 with the internal teeth 21 circumferentially at a high speed. Since difference in number of teeth between the external and internal gears is generally 2n (n is positive integer), relative rotation occurs between these gears 2, 3 and is derived from one of these gears as a rotational output of reduced speed.

The flexible external gear 3 has a tubular body 32, a disk-shaped diaphragms 33 closing one end of the body, a thick boss formed on the center of the diaphragm, and the external teeth 31 formed along a circumferential direction on an outer circumferential surface 35 at the side of an open end of the body.

Figure 2:
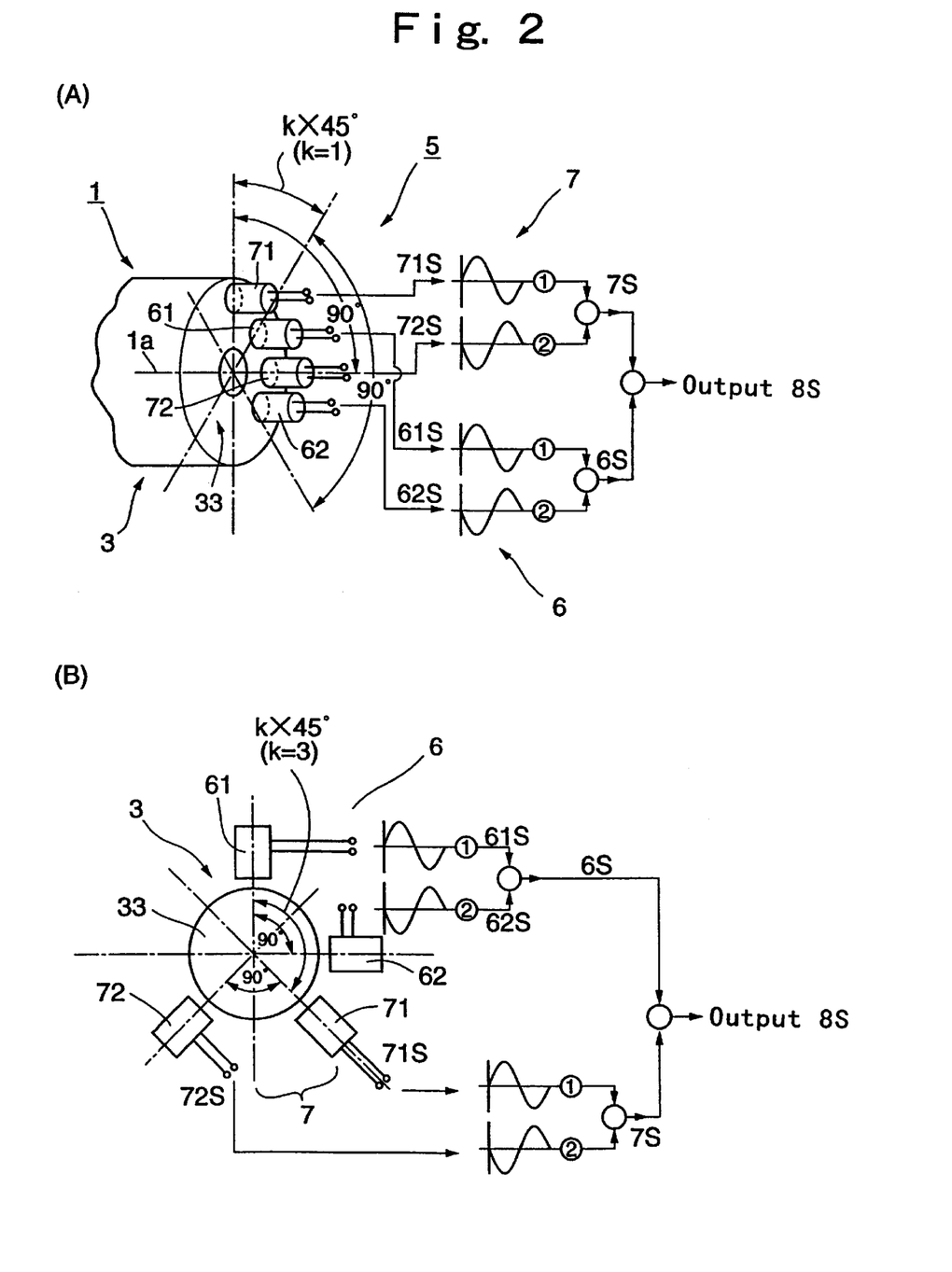
FIGS. 2(A) and 2(B) illustrate positional relationship between two pairs of torque detection devices arranged on a diaphragm and a body of a cup-shaped flexible external gear of FIG. 1, respectively.

FIG. 2 shows a schematic structure of a torque detection mechanism assembled to the above-constituted flexed meshing type gear drive 1. As shown in this figure, the torque detection mechanism 5 has first and second torque detection devices 6 and 7. The first torque detection-device 6 has a pair of torque detection elements 61 and 62 which are disposed on the diaphragm 33 of the flexible external gear 3 and are arranged at an angular interval of 90° from each other around a drive center axis 1a. Likewise, the second torque detection device 7 has a pair of torque detection elements 71 and 72 which are disposed on the diaphragm 33 of the flexible external gear 3 and are arranged at an angular distance of 90° from each other around a drive center axis 1a.

The second torque detection device 7 is placed at an angular position offset from the first torque detection device 6 by (k×45°) around the center axis 1a (k is odd number). Namely, a pair of torque detection elements 71 and 72 are arranged at angular positions offset from a pair of torque detection elements 61 and 62, respectively, by (k×45°). The torque detection elements can be positioned on either an outer or an inner surface of the body. In this example, the second torque detection elements 71 and 72 are arranged at angular positions offset from the torque detection elements 61 and 62 by 45°, respectively (k=1).

The outputs 61S and 62S of the torque detection elements 61 and 62 of the first torque detection device 6 are synthesized to form a synthesized output 6S. Likewise, the outputs 71S and 72S of the torque detection elements 71 and 72 of the second torque detection device 7 are synthesized to form a synthesized output 7S. These synthesized outputs 6S and 7S are then synthesized to form a totally synthesized output 8S which is used as a torque detection output.

Thus, two sets of torque detection devices 6 and 7 are disposed at angular positions offset from each other by 45°, whereby rotational ripple amplitude can greatly be reduced included in the torque detection output, thus realizing a high accurate torque detection. At the same time, linearity of the torque detection output can also be greatly improved.

It is noted that, when a pair of torque detection devices are disposed at angular positions offset from each other by 90° as in conventional cases, rotational ripple content having a period of 180° angle occurring in responsive of deformation of the flexible external gear. It is, however, not possible to suppress or eliminate the remaining rotational ripple contents included in the torque detection output:

As an example of torque detection elements 61, 62, 71 and 72 of the torque detection devices 6 and 7, a strain gauge may be employed. In this case, the respective pair of torque detection elements may be a pair of strain gauges that are adhered on a surface of the body 32 or the diaphragm 33 of the flexible external gear 3 in a manner that these gauges are inclined toward right and left sides, respectively, with respect to the device center axis 1a by an angle of 45°. Further, the strain gauges are connected one another to constitute a bridge circuit to obtain a torque detection output.

Instead of using these contact-type torque detection elements, it is possible to use non-contact-type torque detection elements such as a magnetostrictive-type detection element, a photo-type detection element, an ultra sonic detection element or the like.

The following is a general explanation of experiments conducted in the course to find the 45° angle strain-gauge position according to this invention.
(Positional relationship of strain gauges)

Figure 3:
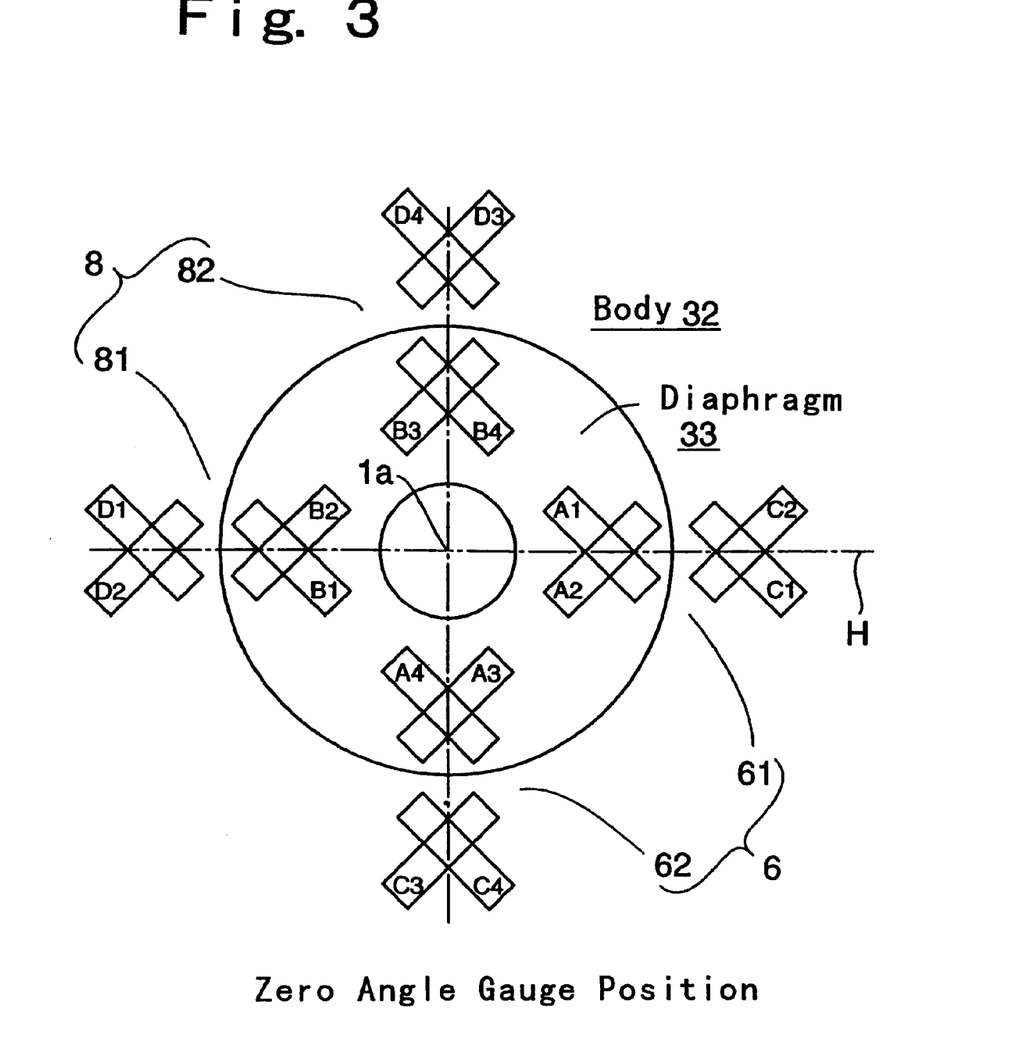
FIG. 3 shows a zero-angle strain-gauge position on the diaphragm and the body of the cup-shaped flexible external gear.

FIG. 3 shows positions of the strain gauges as the torque detection element fixedly adhered to the diaphragm 33 and body 32 of the flexible external gear 3, together with reference numerals attached thereto. In the drawing, with reference to a horizontal line H crossing the device center axis 1a, the shown positional relationship of strain gauges are called herein as a zero angle strain-gauge position.

In this figure, a pair of strain gauges A1 and A2 or those C1 and C2 correspond to the torque detection element 61, while a pair of strain gauges A3 and A4 or those C3 and C4 to the torque detection element 62, these four strain gauges constituting the first torque detection device 6.

Figure 4:
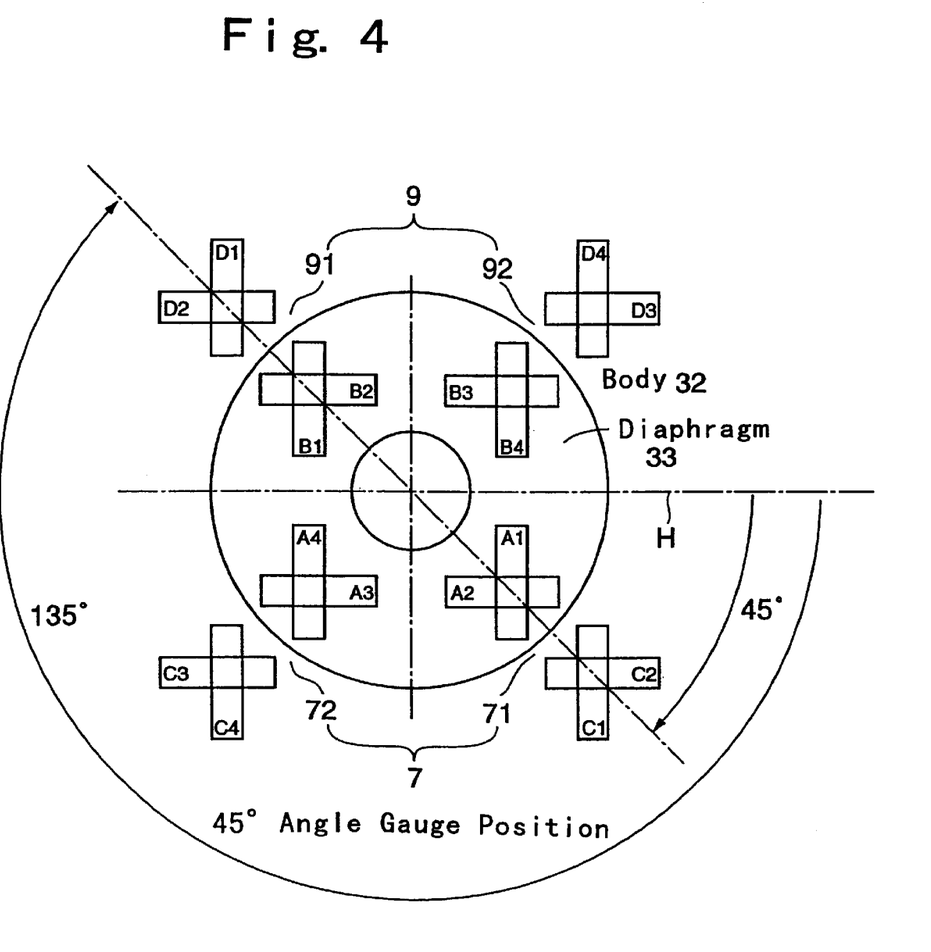
FIG. 4 shows a 45° angle strain-gauge position on the diaphragm and the body of the cup-shaped flexible external gear.

Positional relationship of the strain gauges as shown in FIG. 4 is obtained by rotating the strain gauges shown in FIG. 3 as a whole around the center axis 1a by a 45° angle. The positional relationship of the strain gauges shown in this figure is called herein as a 45° angle strain-gauge position.

In this drawing, a pair of strain gauges A1, A2 or those C1, C2 correspond to the torque detection element 71, and a pair of strain gauges A3, A4 or those C3, C4 to the torque detection element 72, wherein these four strain gauges constitute the second torque detection device 7.
(Linearity and hysteresis)

The four strain gauges A1 to A4 or those C1 to C4 of the first detection device 6 as arranged in FIG. 3 are used to constitute a Wheatstone bridge circuit, whose output FB_A or FB_C was measured. Likewise, the four strain gauges A1 to A4 or those C1 to C4 of the second detection device 7 as arranged in FIG. 4 are used to constitute a Wheatstone bridge circuit, whose output FB_A(45°) or FB_C(45°) was measured.

Figure 5:
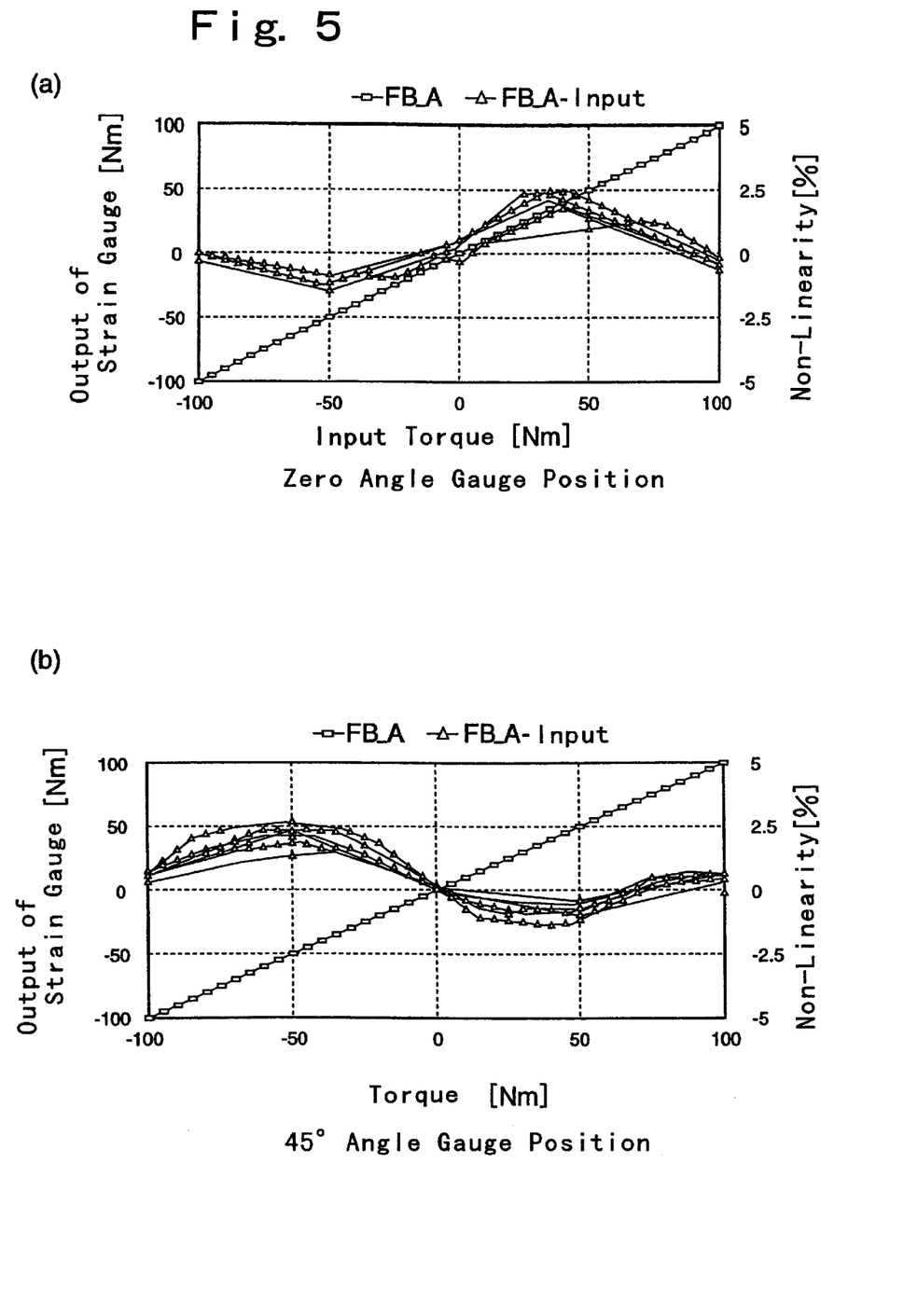
Figure 6:
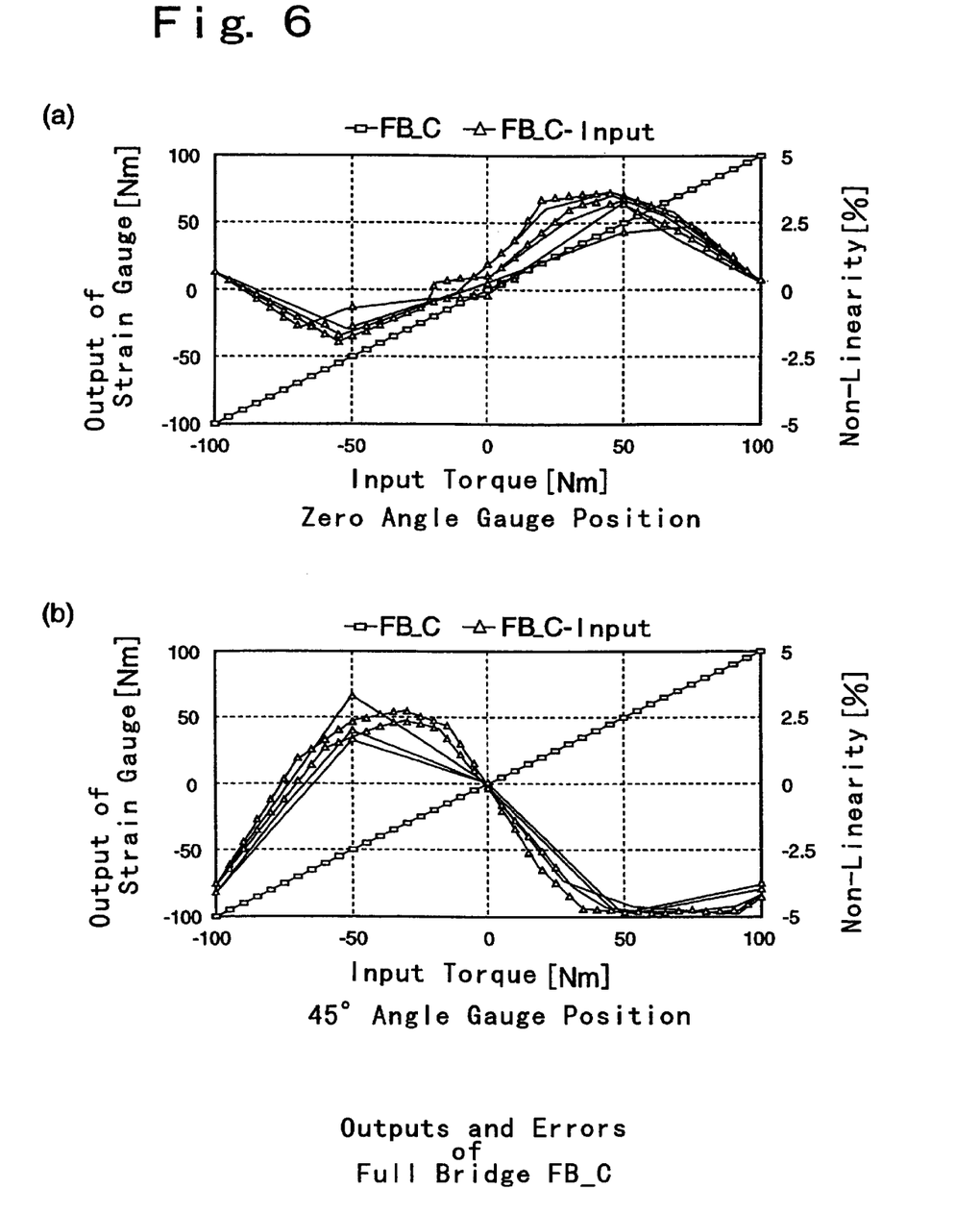

FIGS. 5 and 6 shows examples of output data of the respective Wheatstone bridge circuits. In each of these figures, (a) shows such data as obtained in the case of the zero angle strain-gauge position constituting the first torque detection device shown in FIG. 3, and (b) shows such data as obtained in the case of the 45° angle strain-gauge position constituting the second torque detection device 7 shown in FIG. 4.

As can be seen from these drawings, errors of the outputs of these strain-gauge positions (zero and 45° strain-gauge positions) appear in opposite directions in terms of linearity of these outputs.

Figure 7:
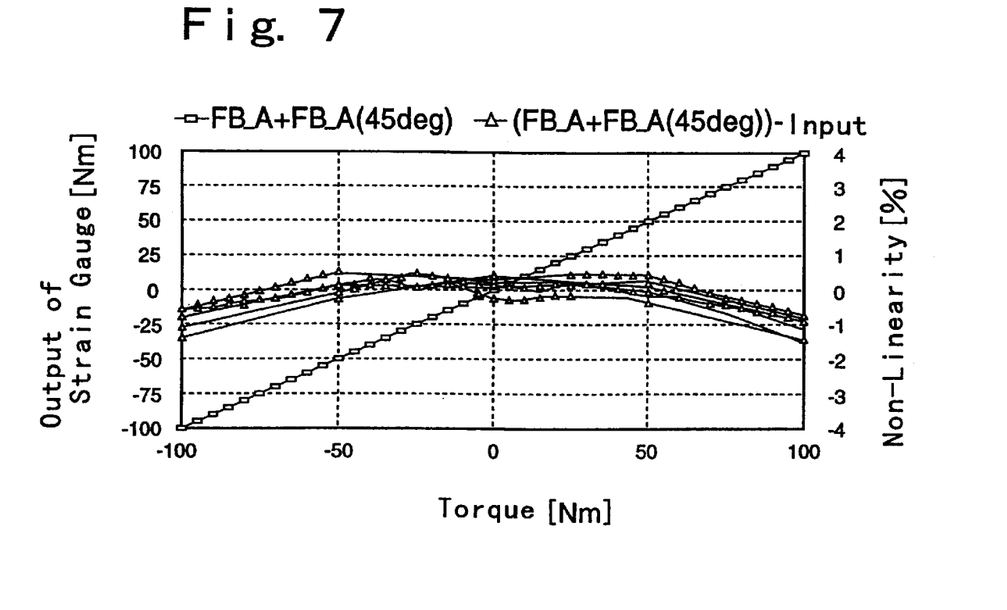
FIG. 7 is a graph showing a synthesized output of the second torque detection devices of the zero-angle strain-gauge position the diaphragm, respectively.
Figure 8:
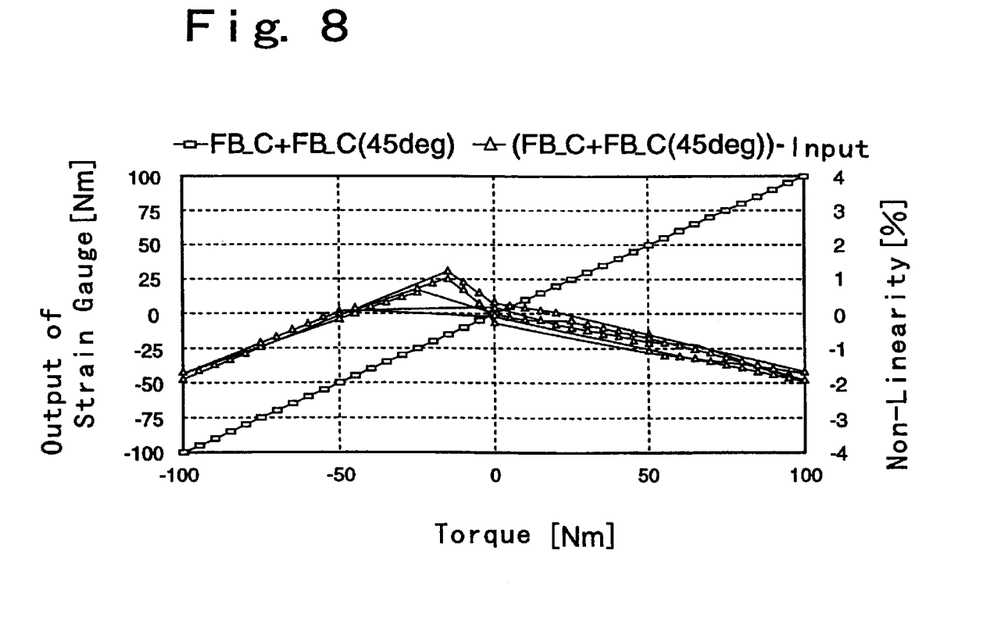
FIG. 8 is a graph showing a combined output of the second torque detection devices of the zero and 45° strain-gauge positions on the body, respectively.

FIGS. 7 and 8 show results of measurements when the outputs of the two bridge circuits are synthesized, in other words, when the outputs of the first and second torque detection devices 6 and 7.

As shown in these drawings, synthesizing the outputs of the first and second torque detection devices 6 and 7 can enhance an accuracy of linearity of the detection outputs up to about 2 percent. In contrast, when the individual outputs of these torque detection devices are concerned, an accuracy of linearity of the detection outputs is about 5 percent. Thus, by using the outputs of the first and second torque detection devices 6 and 7 which are arranged at 45° angular positions with each other, the linearity of the torque detection output can be greatly improved. In comparison, when the first and second torque detection devices 6, 7 are arranged at 90° angular positions with each other as in conventional cases, such an excellent result cannot be obtained. The accuracy of linearity of the detection output remains about 5 percent.

Next, third and fourth torque detection devices 8 and 9 were added to the above first and second torque detection devices 6 and 7. More specifically, as shown in FIG. 3, the third torque detection device 8 was constituted by a torque detection element 81 including a pair of strain gauges B1, B2 or those D1, D2, and a torque detection element 82 including a pair of strain gauges B3, B4 or D3, D4. Likewise, as shown in FIG. 4, the fourth torque detection device 9 was constituted by a torque detection element 91 having a pair of strain gauges B1, B2 or D1, D2, and a torque detection element 92 having a pair of strain gauges B3, B4 or D3, D4.

In this condition, the output of the first detection device 6 of FIG. 3 was synthesized with the output of the second detection device 7 of FIG. 4 to obtain a synthesized output, which was then measured.

Figure 9:
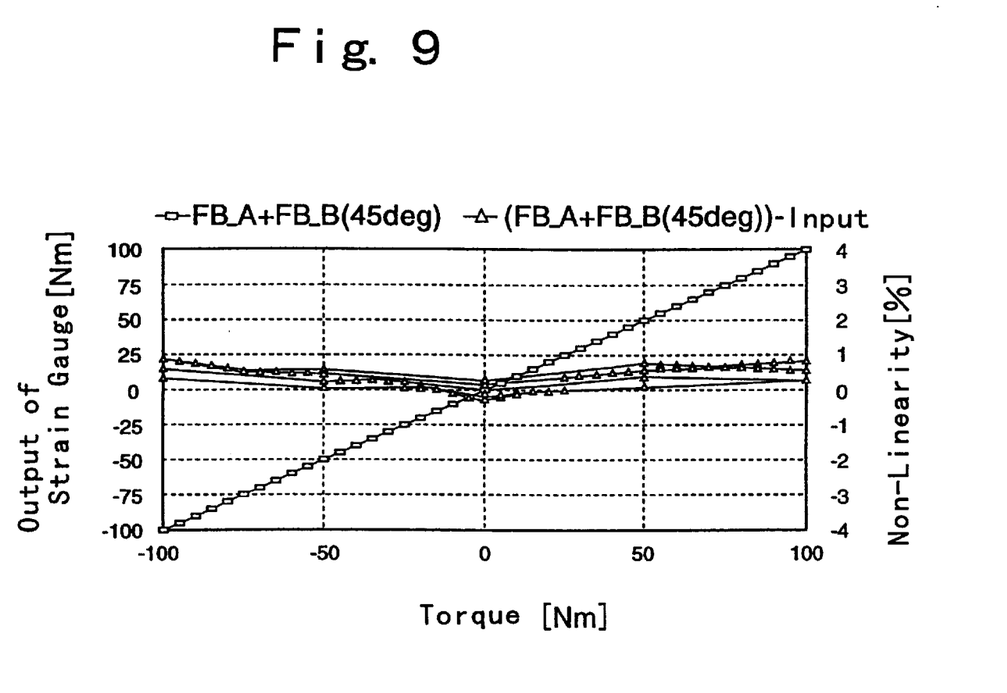
FIG. 9 is a graph showing a synthesized output of the first torque detection devices on the diaphragm at angular positions offset from each other by 225°.

Results are shown in FIG. 9. As shown in this figure, an accuracy of linearity of the torque detection output was enhanced up to about 1 percent. According to experiments conducted by the inventors of this invention et. al, it was confirmed that the accuracy of linearity of torque detection output can be enhanced when one of the torque detection devices is arranged at an angular position offset from the other one by 135° or 225°, rather than when one is arranged at an angular position offset from the other by 45°.

Furthermore, according to experiments by the inventor of this invention et. al, it was also confirmed that the accuracy of linearity of torque detection output can be improved up to about 1 percent by synthesizing the outputs of the first to fourth torque detection devices 6 to 9 shown in FIGS. 3 and 4.

(Rotational ripple)

Figure 10:
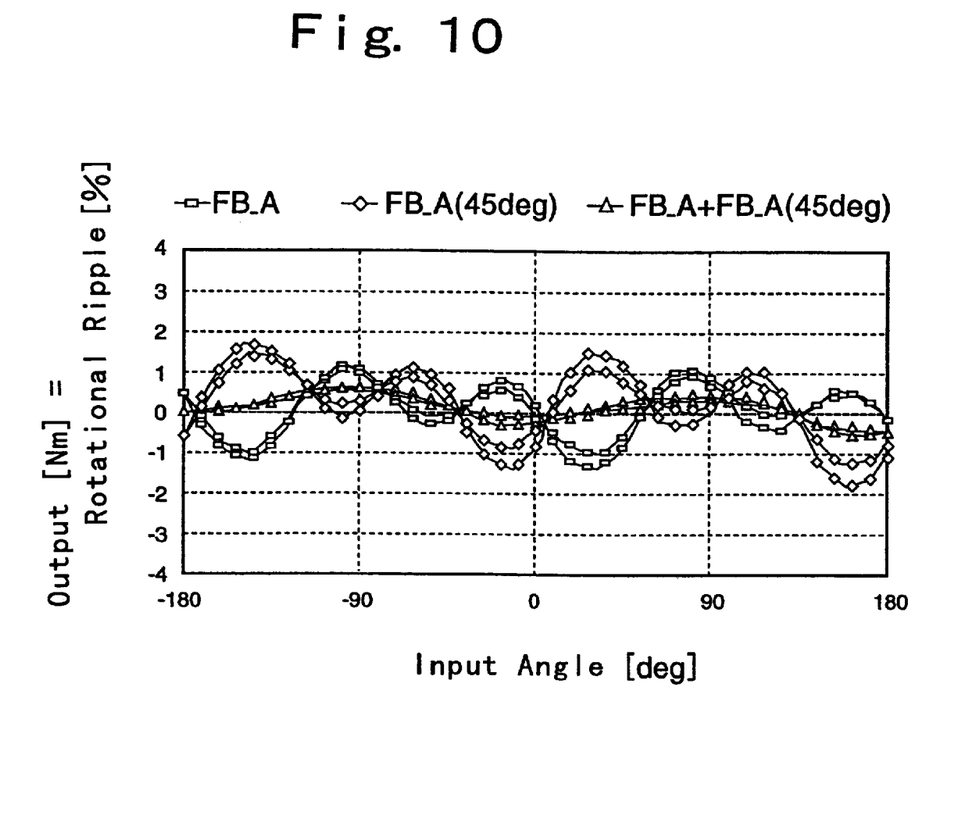
FIG. 10 is a graph showing a combined output (rotational ripple) of the first and second torque detection devices disposed on the diaphragm.

Next, consideration is made to rotational ripple contents included in the outputs of the first and second torque detection devices 6 and 7 as shown in FIGS. 3 and 4, respectively. FIG. 10 shows rotational ripple of each of the detection outputs of the first and second torque detection devices 6 and 7, and that of a synthesized output of these outputs. As shown in this figure, the rotational ripple content has a period of 90° angle, which means that the outputs of the first and second torque detection devices 6 and 7 arranged offset from each other by a 45° angle are a 45° angle offset in phase with each other. Consequently, when synthesizing these two outputs, an amplitude of the rotational ripple can be reduced up to about 2 percent.

According to experiments conducted by the inventors of this invention and others, when four torque detection devices are employed, it was confirmed that rotational ripple amplitude can be more reduced by arranging these four devices at an equal angle of 22.5°.

Figure 11:
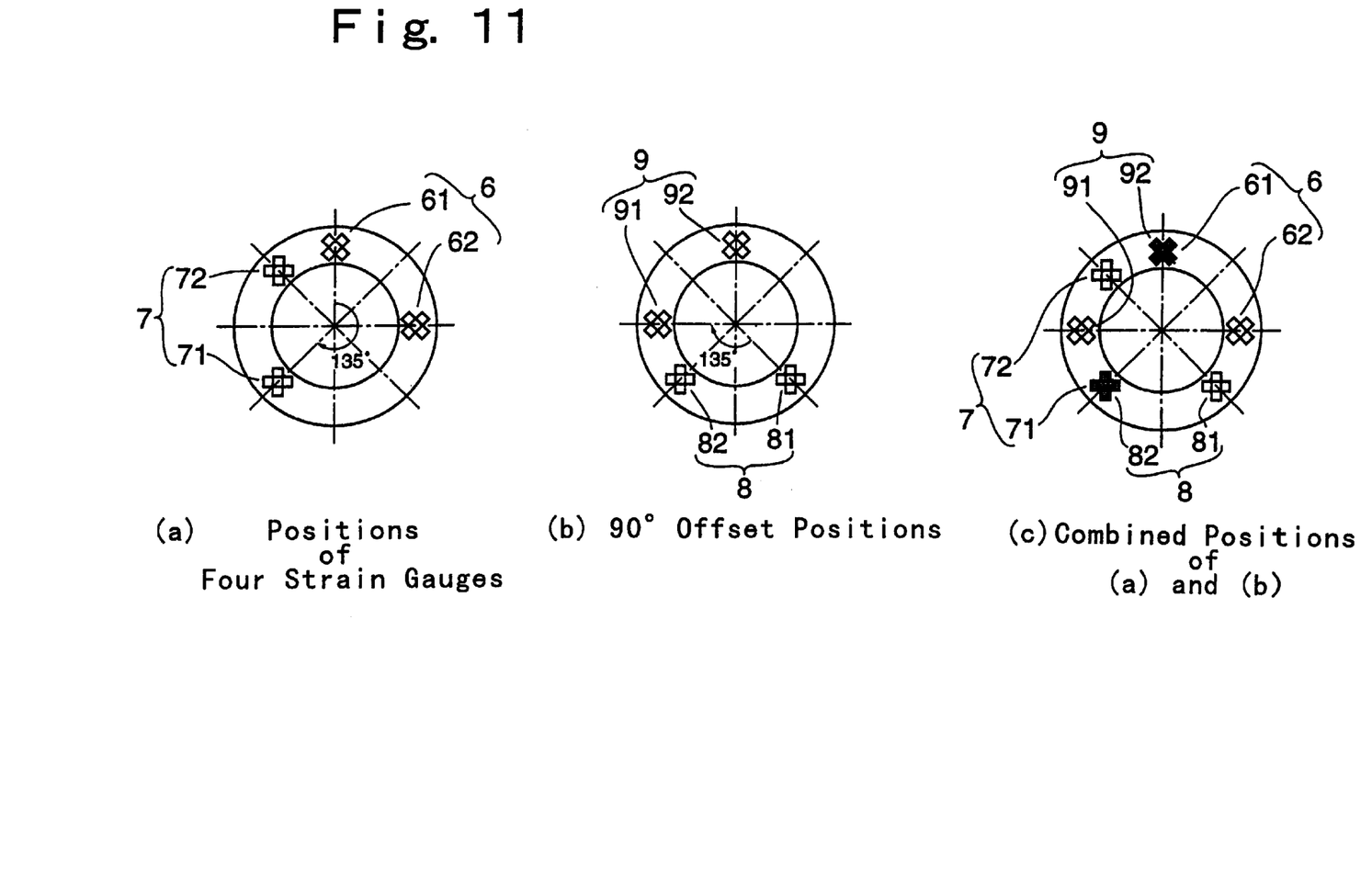
FIG. 11 is an explanatory view showing positions of four pairs of torque detection devices.

Then, the inventors of this invention and others arranged four torque detection devices 6 to 9 as follows and obtained their synthesized output. More specifically, as shown in FIG. 11(a), first and second torque detection devices 6 and 7 were disposed at angular positions offset from each other by a 135° angle. Further, as shown in FIG. 11(b), third and fourth torque detection devices 8 and 9 are similarly disposed at angular positions offset from each other by a 135° angle. As can be seen from these drawings, the third and fourth torque detection devices 8, 9 are arranged as a whole at a 90° rotated angular position with respect to the first and second torque detection devices 6 and 7.

Therefore, as shown in FIG. 11(c), since the torque detection element 61 of the first torque detection device 6 was disposed at the same angular position as that 92 of the fourth torque detection device 9, a common torque detection element was used for these. Likewise, the torque detection element 71 of the second torque detection device 7 was disposed at the same angular position as that 82 of the third torque detection device 8, and therefore a common torque detection element was used for these.

Figure 12:
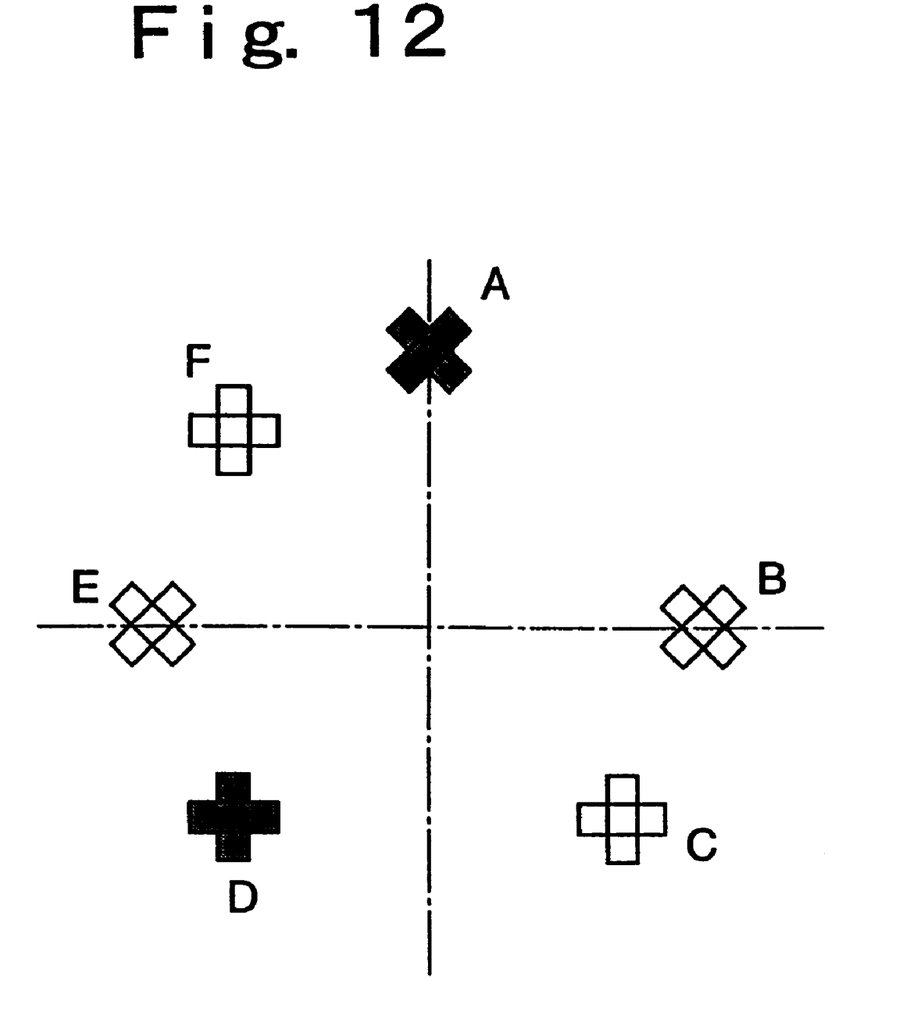
FIG. 12 is an explanatory view showing outputs of the torque detection devices when torque detection elements are positioned at the same place with each other; and, FIG. 13 is an explanatory view showing position of four pairs of torque detection devices.

In this case, torque detection elements (strain gauges) at two positions are overlapped with each other. Thus, with reference to FIG. 12, where an output of a wheatstone bridge circuit of A and D is U1 and that of B, C, D and E is U2, an output U of this torque detection device can be obtained as follows:

$$U=2U1+U2$$

When four torque detection devices were arranged as mentioned above, the obtained synthesized output was confirmed to exhibit an reduced rotational ripple. Thus, by adopting these positional relationship of torque detection elements, a high accurate torque detection can also be realized.

Figure 13:
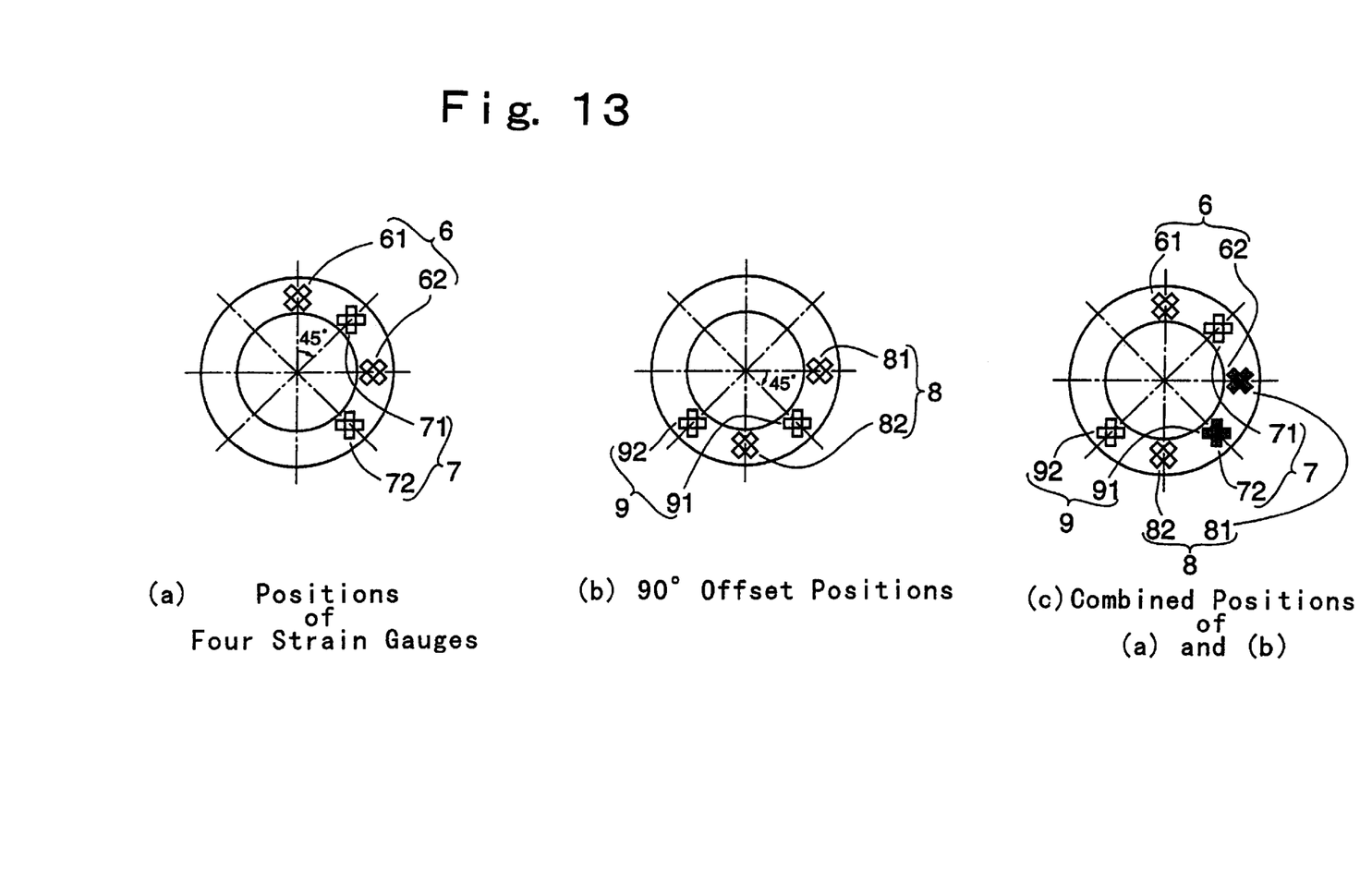

It is noted that, as angular positions of the torque detection elements (strain gauges), one can be adopted wherein a set of elements arranged at 90° angular positions are disposed at 135° rotated angular position with respect to the other set of elements arranged at 90° angular positions as shown in FIG. 11, and one can be adopted wherein a set of elements arranged at 90° angular positions are disposed at 45° rotated angular position with respect to the other set of elements arranged at 90° angular positions as shown in FIG. 13.

(Other examples)

The above-mentioned examples are those wherein a cup-shaped flexible external gear is employed. It is, however, noted that the above-mentioned structure can also applied when a silk-hat shaped flexible external gear is employed. Further, this invention can also be applied when a flexible external gear having a simple shape of circle is employed.

While, the torque detection devices may be disposed either on the diaphragm or body of the flexible external gear.

Furthermore, examples as a torque detection means applicable to the torque detection mechanism of this invention are those of strain-gauge type, magnetostrictive type, photo-type, ultrasonic type and the like. One type of these detection devices can be used, and combination of two or more of these types can also be employed.

As explained above, in the torque detection mechanism for a flexed meshing type gear drive according to this invention, at least two torque detection devices are disposed at an angular interval of (k×45°) (k is odd number) around the center axis, and outputs of these detection devices are synthesized to obtain an synthesized output, based on which a torque is detected. According to the torque detection mechanism of this invention, linearity of the torque detection output can be improved. At the same time, an amplitude of rotational ripple included in the torque detection output can be greatly reduced.

Accordingly, with the torque detection mechanism of this invention, a high accurate torque detection can be realized compared to those of conventional cases.

What is claimed is:

1. A torque detection mechanism for a flexed meshing type gear which has a circular rigid internal gear, a circular flexible external gear disposed inside the rigid internal gear and formed on its circumferential surface with external teeth meshable with internal teeth of the rigid gear, and a wave generator fixed into the flexible external gear for flexing it radially to mesh the external teeth with the internal teeth at both ends on a diametrical direction thereof and for moving meshed portions in a circumferential direction, the torque detection mechanism comprises:

a first torque detector which has a pair of first torque detection elements arranged on at least one of outer and inner surfaces of the flexible external gear except for where the external teeth are formed, the first torque detection elements being arranged at an angular interval of 90° around a center axis of the flexible external gear, and a second torque detector which has a pair of second torque detection elements arranged on at least one of outer and inner surfaces of the flexible external gear except for where the external teeth are formed, the second torque detection elements being arranged at an angular interval of 90° around the center axis of the flexible external gear;

the second torque detector is arranged at a (k×45°) rotated angular position from the first torque detector around the center axis (k is odd number); and means for synthesizing detection outputs of the first and the second torque detectors to obtain a synthesized output, based on which synthesized output a torque transferred via the flexed meshing type gear drive is detected.

2. A torque detection mechanism for a flexed meshing type gear drive according to claim 1, wherein the second torque detector is arranged at an angular position between 90° to 270° rotated from the first torque detector around the center axis.

3. A torque detection mechanism for a flexed meshing type gear drive according to claim 1, further comprising a third torque detector which has a pair of third torque detection elements arranged on at least one of outer and inner surfaces of the flexible external gear except for where the external teeth are formed, the third torque detection elements being arranged at an angular interval of 90° around the center axis of the flexible external gear, and a fourth torque detector which has a pair of fourth torque detection elements arranged at an angular interval of 90° around the center axis of the flexible external gear, wherein the second torque detector is arranged at a 45° angle rotated position from the first torque detector around the center axis, and wherein the third and fourth torque detectors are arranged respectively at 180° and 225° angle rotated positions from the first torque detector around the center axis.

4. A torque detection mechanism for a flexed meshing type gear drive according to claim 1, further comprising a third torque detector which has a pair of third torque detection elements arranged on at least one of outer and inner surfaces of the flexible external gear except for where the external teeth are formed, the third torque detection elements being arranged at an angular interval of 90° around the center axis of the flexible external gear, and a fourth torque detector which has a pair of fourth torque detection elements arranged at an angular interval of 90° around the center axis of the flexible external gear, wherein the second, third and fourth torque detectors are placed respectively at 22.5°, 45° and 67.5° rotated angular positions from the first torque detector around the center axis.

5. A torque detection mechanism for a flexed meshing type gear drive according to claim 1, further comprising a third torque detector which has a pair of third torque detection elements arranged on at least one of outer and inner surfaces of the flexible external gear except for where the external teeth are formed, the third torque detection elements being arranged at an angular interval of 90° around the center axis of the flexible external gear, and a fourth torque detector which has a pair of fourth torque detection elements arranged at an angular interval of 90° around the center axis of the flexible external gear, wherein the third and fourth torque detectors are placed respectively at 90° rotated angular positions from the first and second torque detectors around the center axis.

6. A torque detection mechanism for a flexed meshing type gear drive according to any one of claims 1 to 5, the flexible external gear is a cup-shaped one that has a tubular body, a disk-shaped diaphragm closing one end of the body, a thick boss integrally formed on a center portion of the diaphragm, the external teeth formed on an outer circumferential surface at the side of an open end of the body.

7. A torque detection mechanism for a flexed meshing type gear drive according to claim 6, wherein the torque detectors are disposed on at least one of the body and the diaphragm.

8. A torque detection mechanism for a flexed meshing type gear drive according to any one of claims 1 to 5, wherein the torque detectors are at least either one of strain-gauge type, magnetostrictive-type, photo-type, and ultrasonic type magnetic impedance detecting element.

9. A torque detection mechanism for a flexed meshing type gear drive according to any one of claims 1 to 5, wherein the flexible external gear is a silk-hat one that has a tubular body, circular diaphragm extending radially and outwardly from one end of the body, a thick boss formed on an outer circumferential rim of the diaphragm, and the external teeth formed on an outer circumferential surface of at the side of the other end of the body.

10. A torque detection mechanism for a flexed meshing type gear drive according to claim 9, wherein the torque detectors are disposed on at least either one of the body and the diaphragm.

* * * * *